Figure 1:
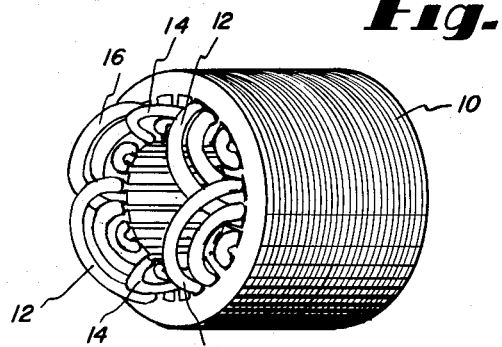

April 3, 1962

E. P. LARSH 3,028,266

METHOD AND APPARATUS FOR IMPREGNATING MOTOR WINDINGS AND MOTOR STATOR

Filed Nov. 4, 1957

4 Sheets-Sheet 1

INVENTOR.
EVERETT P. LARSH
BY Taulmin & Taulmin
Attorneys

April 3, 1962 E. P. LARSH 3,028,266
METHOD AND APPARATUS FOR IMPREGNATING
MOTOR WINDINGS AND MOTOR STATOR
Filed Nov. 4, 1957 4 Sheets-Sheet 3

INVENTOR.
EVERETT P. LARSH
BY Toulmin & Toulmin
Attorneys

April 3, 1962
E. P. LARSH
3,028,266
METHOD AND APPARATUS FOR IMPREGNATING
MOTOR WINDINGS AND MOTOR STATOR
Filed Nov. 4, 1957
4 Sheets-Sheet 4
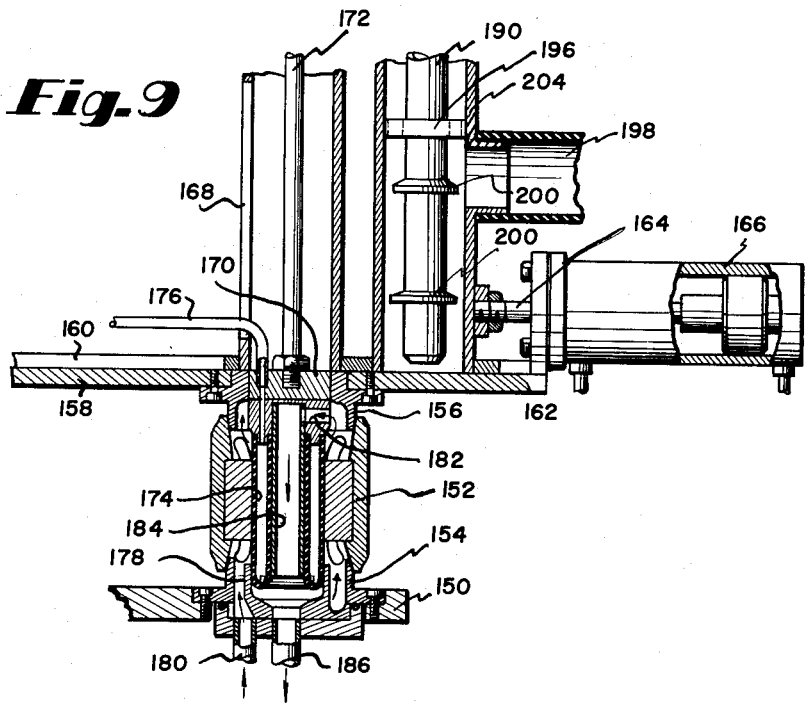
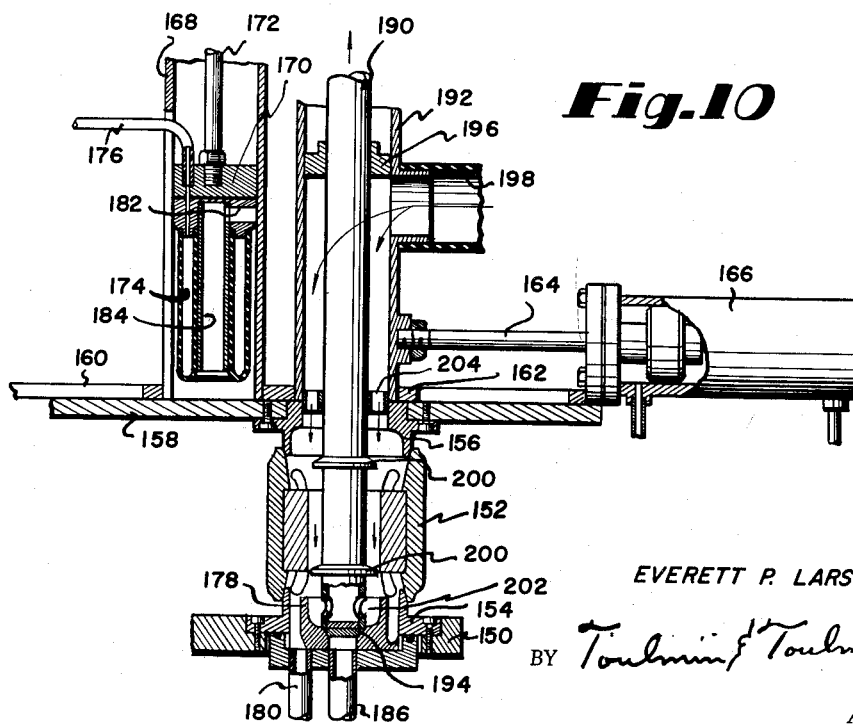
INVENTOR
EVERETT P. LARSH
BY Toulmin & Toulmin
ATTORNEYS

United States Patent Office 3,028,266
Patented Apr. 3, 1962

3,028,266
METHOD AND APPARATUS FOR IMPREGNATING MOTOR WINDINGS AND MOTOR STATOR
Everett P. Larsh, 124 E. Monument Ave., Dayton, Ohio
Filed Nov. 4, 1957, Ser. No. 694,325
4 Claims. (Cl. 117—232)

This invention relates to electric motors and particularly to the impregnation of the windings thereof and more especially to the impregnation and insulation of the windings of such motors.

The invention is also applicable to other electromagnetic units, such as armatures.

It is a primary object of the present invention to provide a method and apparatus for the impregnation of wound electromagnetic members which will eliminate work operations such as the masking off of parts of the iron portion of the unit thereby reducing the labor and material required for the impregnating operation as well as eliminating the necessity for subsequent cleaning up operations.

A further object of this invention is the provision of a method and apparatus for impregnating electromagnetic units which has extreme flexibility and adaptability to various types of workpieces and for several types of impregnation and which provides a choice of preheating, evacuating, the number of coats, the type of impregnating fluid or varnish employed, and the opportunity of providing insulating additives to the fluid if desired.

A still further object of this invention is the provision of a method and apparatus for impregnating windings with a circulating fluid under pressure whereby to flush air from the windings thereby substantially eliminating air pockets and thus improving the efficiency of the insulation provided for the impregnation process.

A still further object of this invention is the provision of a method and apparatus for impregnating the windings of electromagnetic units which requires less space and equipment and time than heretofore, thereby reducing inventories and the cost of accomplishing the impregnation.

A still further object of this invention is the provision of a stator in which the windings are insulated from each other simultaneously with the impregnating thereof with varnish.

Another object of this invention is the provision of a method and apparatus for impregnating the windings of electric motor stators while simultaneously providing a layer of insulation on the stator windings.

The foregoing objects and advantages are arrived at, in brief, by winding an electric motor stator phase by phase and by impregnating the windings following the application to the stator of each phase, and with the impregnating of the windings being accompanied, optionally, by the depositing on the outer surface thereof of a layer of solid insulating material such as asbestos fiber or other suitably mechanically strong insulating fiber, or mica flakes, or the like.

Figure 2:
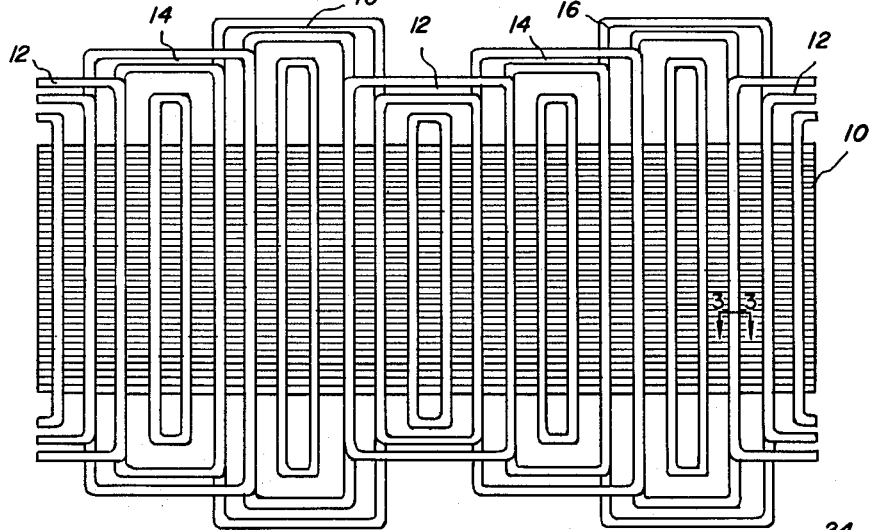
Figure 3:
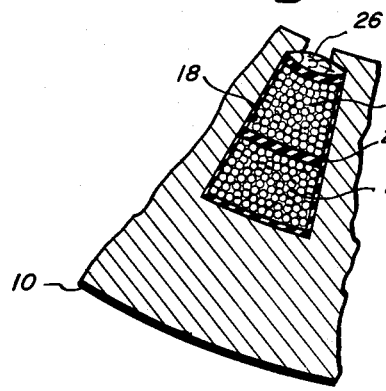
Figure 4:
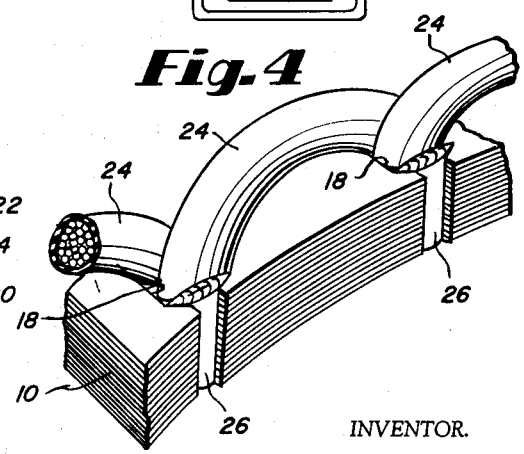
Figure 5:
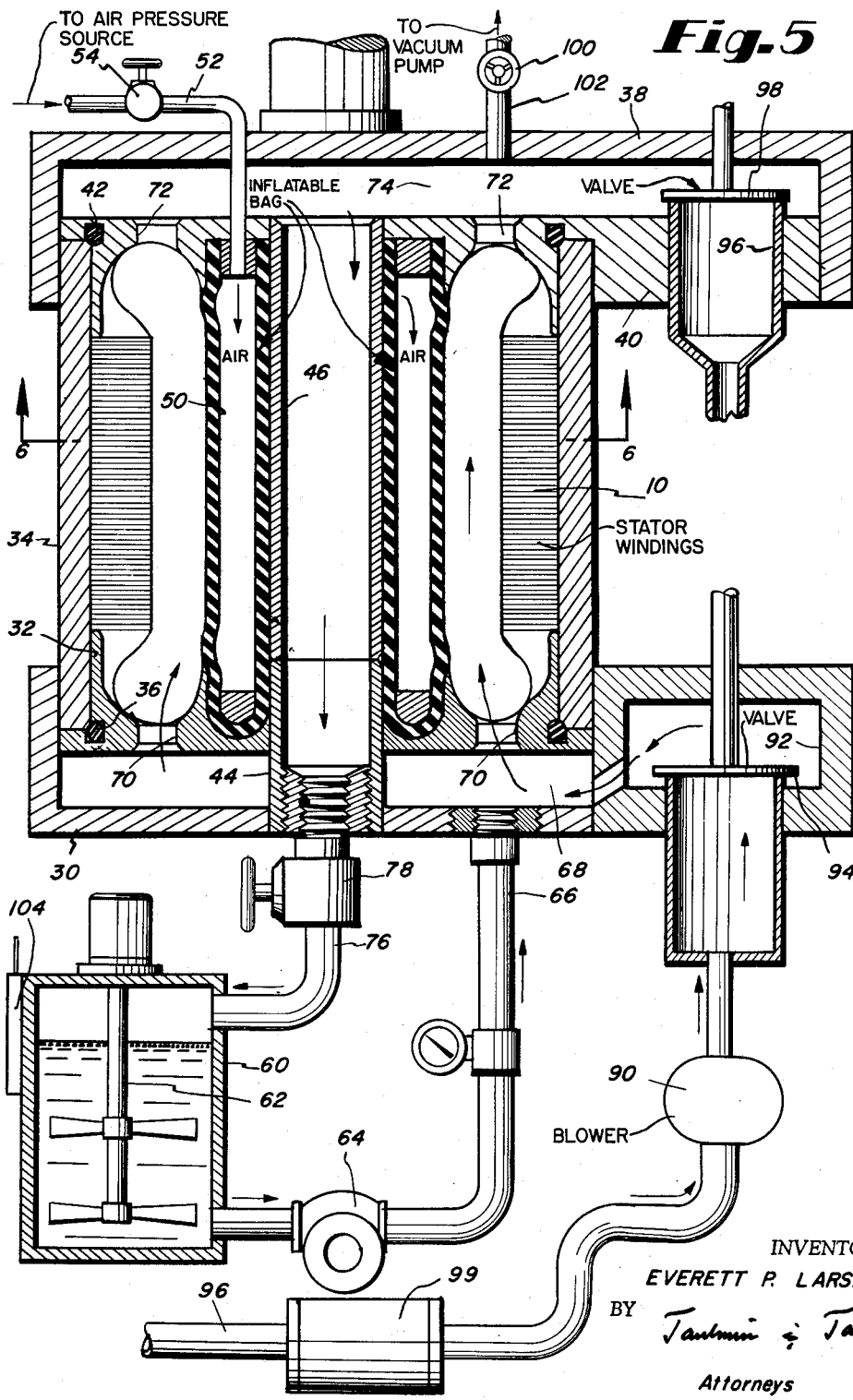
Figure 6:
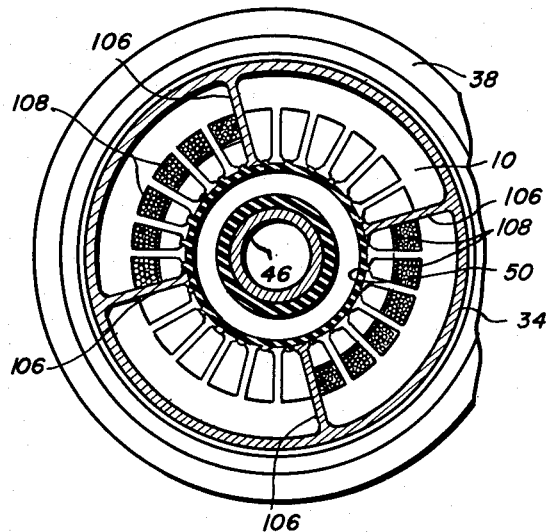
Figure 7:
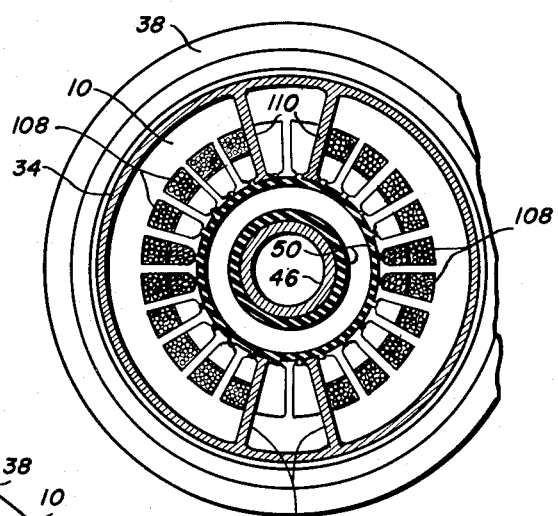
Figure 8:
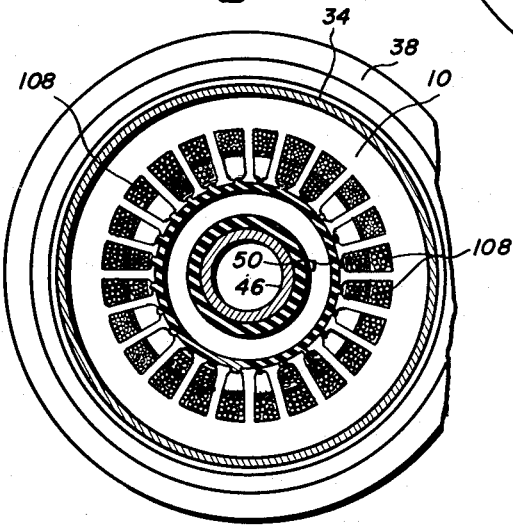

The several objectives referred to above, as well as still other objects and advantages of this invention, will become more apparent upon reference to the following specification taken in connection with the accompanying drawings in which:

FIGURE 1 is a perspective view, somewhat diagrammatic in nature, illustrating a completely wound two pole three phase electric motor stator, FIGURE 2 is a diagrammatic representation of the windings on the stator FIGURE 1 showing the manner in which certain ones of the coils are placed in the same slots with other coils, FIGURE 3 is a cross sectional view indicated by line 3—3 on FIGURE 2 and drawn at enlarged scale, showing the coil sides in the pertaining slot and the insulating layer of fibers therebetween, FIGURE 4 is a perspective view showing the ends of two adjacent slots and the windings therein and illustrating the fibrous insulating deposit on the windings, FIGURE 5 is a vertical sectional view, rather diagrammatic in nature, showing a representative apparatus in which the motor stators are placed for the impregnating operation, FIGURE 6 is a sectional view indicated by line 6—6 on FIGURE 5, showing the construction of the top part of the impregnating apparatus as it appears when a stator with only a single phase wound therein is placed in the apparatus, FIGURE 7 is a view like FIGURE 6 except that it shows the apparatus as it appears when the stator has two phases wound therein, FIGURE 8 is a view similar to FIGURES 6 and 7 but shows the completely wound stator in place in the apparatus, FIGURE 9 is a sectional view showing a modified arrangement of the impregnating apparatus according to this inventor, and FIGURE 10 is a view like FIGURE 9 but with the apparatus in a different position.

Referring to the drawings somewhat more in detail, 10 indicates a laminated iron stator and figure and this laminated iron stator may be more or less conventional in nature, consisting of a plurality of stacked stator laminations connected together by through rivets or by welding and having a central bore surrounded by a plurality of inwardly opening radial slots.

In these slots are placed the coils making up the field winding of the stator. The stator in FIGURE 1 is a three phase stator, and to this end the two groups of coils at 12 may comprise one phase, the groups at 14 a second phase, and the groups at 16 a third phase.

A diagrammatic developed view of the stator and windings is illustrated in FIGURE 2, and it will be noted therein that each of the groups of windings consist of three coils distributed over six adjacent slots. Because of this distribution of the windings, the sides of the two outer coils of each group of coils are disposed in the same slot as the sides of two coils of a group of coils pertaining to another phase. It will be evident that the winding arrangement illustrated is only one of several that could be employed, and that even in the case of a single phase motor it might occur that the sides of two different coils might be disposed in a single slot.

According to the present invention, the coil sides are insulated from each other by a layer of finely divided insulating material, such as asbestos fiber or mica flakes, and varnish which provides highly effective electrical insulating material with a minimum of bulk. As will be seen in FIGURE 3 the slot 18 illustrated therein has one coil side 20 in the bottom of the slot, and a second coil side 22 in the upper part of the slot, and between the coil sides is a layer of varnish and insulating material 24. A wooden peg according to conventional practices may be driven in the mouth of the slot as at 26 thus firmly binding the coil sides in place. According to the usual practices the wire from which the coils are wound is itself insulated, and the slot 18 would either be lined with an insulating paper or provided with a layer of insulating material, glass or polyester resin, for example.

FIGURE 4 illustrates the manner in which the deposit 24 builds up over the entire coil surfaces, thus providing protection not only where there are coil sides adjacent one another but also over the end parts of the coils where they extend from one slot to another.

The insulating layer is applied to the coils of the stator by a process carried out in the apparatus of FIGURE 5. This process consists of impregnating the coils under pressure with varnish preferably heated to, say, 120° F., and which varnish may carry in suspension a fibrous, flock, or flake material such as asbestos fibers or mica flakes. The fibers or flakes can be of substantially any size and length that will be conveyed by the varnish and which will remain in suspension therein as the varnish passes through the stator. What occurs when the varnish and the material suspended therein is delivered to the stator under pressure, is that the varnish penetrates and impregnates the coils, the solid material carried thereby is deposited on the windings and between the wires at the outside of the windings, and this solid material will cling to the windings and build up a substantial layer thereon which will serve to insulate the impregnated winding from any other winding wound adjacent thereto.

In FIGURE 5 the apparatus for carrying out this process consists of a base member 30 having a member 32 forming an annular recess for receiving the lower end of stator 10. A sleeve 34 surrounds the stator and has sealing engagement with a sealing ring 36 carried by annular member 32.

The apparatus also comprises a top part 38 similarly provided with a member 40 providing an annular recess for receiving the upper end of the stator and also carrying a sealing ring 42 to engage the upper end of sleeve 34.

The base part 30 has a short sleeve 44 extending upwards in the center thereof, and the top part 38 has a rather long sleeve 46 extending downwardly on the center thereof and registering with sleeve 44 thereby to provide a return conduit, as will be seen hereinafter.

It will be seen that the stator is completely closed and that the shape of the members 32 and 40 is such that the ends of the coils on the stator are bent outwardly slightly, as is customary practice, thereby to provide adequate clearance at the ends of the stator for the rotating parts of the electric motor.

The top part 38 also carries an annular inflatable rubberlike bag 50 which surrounds sleeve 46 and which will easily slip within the bore in the stator when deflated. When the bag is inflated, it will be pressed sealingly against the inside surface of the stator and also against the windings at the opposite ends of the stator and will assist in pressing the windings backwards from the surface of the bore through the stator. Inflation of the bag can be accomplished by air pressure by a conduit 52 that has therein a shutoff valve 54.

The varnish and the solid material suspended therein are contained within a tank 60 that is preferably provided with a motor driven agitator 62 so that the solid material is maintained admixed with the varnish and suspended therein.

A pump 64 has its suction side connected with the tank and its discharge side connected by conduit 66 with chamber 68 in base part 30 which communicates through ports 70 with the windings that are to be impregnated.

The top part 38 is similarly provided with ports 72 communicating with the windings to be impregnated and which ports open into a chamber 74 in the said top part that opens directly into sleeve 46 and which sleeve communicates through sleeve 44 with a return conduit 76 leading back to tank 60. Conduit 76 preferably includes a restrictor valve 78 so that a predetermined pressure can be built up on the fluid with which the windings are being impregnated and which pressure may be indicated by the pressure gauge connected with conduit 66. Twenty pounds per square inch has been found to be a workable pressure, and circulation of the fluid is continued for one minute. The particular time, pressure, and temperature employed, however, may be varied to meet varying circumstances.

It is preferred for the conduits and the apparatus described to be lined with Teflon to prevent adherence thereto of the varnish, and if this is done the apparatus can be used for a considerable time without cleaning although an occasional flushing out thereof will assist in removing deposits of solid material that may settle out by a gravity action.

Inasmuch as it is desirable for the varnish to be at least partly set before the stator has other windings placed thereon, I prefer to provide a baking operation that takes place directly within the apparatus. This baking operation is accomplished by blowing air by a blower 90 into a chamber 92 when valve 94 thereof is open and whence the air passes into chamber 68 and through the region of impregnation of the stator into chamber 74. From chamber 74 the air will pass into conduit 96 by opening valve 98 therein and will then return through conduit 96 to a heater 99.

It will be evident that conduit 96 could lead to exhaust if so desired, and fresh air drawn into the heater, but in most cases it will suffice for the air and vapors to be circulated in a heated condition whereupon the varnish will be set at least partially and the fibers will be held in place on the windings.

It will also be evident that the impregnating of the windings could be accompanied by an evacuation of air therefrom as by connecting a vacuum pump to chamber 74 through valve 100 and conduit 102 if desired. This would improve the quality of the impregnation and tend to fill all spaces between the wires with varnish.

In order to arrive at a full automatic apparatus, it is also desirable for there to be an automatic liquid level control device 104 associated with tank 60 for making up varnish and suspended fibers thereto in the proper amount.

Referring again to the bag 50, it has been mentioned that this bag should be expansible to a degree that will seal about the inside of the rotor and which will also bend the coil ends back slightly as illustrated. It is also preferred for this bag to be sufficiently soft that it will form slightly into the slots thereby preventing any accumulation of varnish at the mouths of the slots which might extend inwards into the bore in the stator, thus requiring an additional work operation for the removal thereof.

While the apparatus of FIGURE 5 could be arranged so that the entire stator was treated at one time on each impregnating operation, and this, in fact, would have certain advantages in that the slots would all be coated with varnish for insulating purposes, it is also possible to treat only that portion of the stator that has been wound in the last winding operation.

For example, in FIGURE 6 the top part 38 of the apparatus is shown as being provided with partitions 106 that isolate the windings 108 of the first phase placed on the stator. The bottom part 30 of the apparatus would be provided with similar partitions. This permits only the wound part of the stator to be treated with the varnish.

When this procedure is followed, the stator is placed in a second apparatus after being wound with a second phase, and in this second apparatus partitions 110 are provided which, as in the case of the partitions 106, seal off the unwound slots from treatment or permitting the varnish to be supplied to all other slots.

After the third phase is wound on the stator, the top part and base part of the apparatus are free of partitions as illustrated in FIGURE 8, at which time the entire stator is treated.

It will be evident from the foregoing that the stator treating process, according to the present invention, lends itself well to automatic handling of the stators, and as an example, an unwound stator might pass through a first automatic winding machine and have one phase supplied thereto and then be automatically delivered to a first treatment station for impregnation, and then pass successively and automatically through second and third winding stations with the stator being automatically impregnated following each winding operation. After the stator is completely wound and impregnated, it may be baked in order thoroughly to cure the varnish and thereafter the stator is ready to be assembled into a completed motor.

In the modified arrangement of FIGURES 9 and 10 there is shown a somewhat improved form of the impregnating apparatus which is specially adapted for full automatic work cycles. In these figures there is a turret 150 on which the stator 152 to be impregnated rests by virtue of the upstanding sleeve 154 that sealingly engages the lower end of the stator frame.

The upper end of the stator frame is adapted for being sealingly engaged by a similar sleeve member 156 carried on the plate 158.

Plate 158 comprises guideways 160 extending thereacross in which is slidable a slide 162 that has connected therewith ram 164 of a fluid motor 166. Slide 162 has two stations thereon, and one is made up of a tubular element 168 in which is slidable a block 170 by a rod 172. Block 170 supports an inflatable rubberlike bag 174 that corresponds in function to the rubberlike bag 50 previously described. This bag is expansible by compressed air supplied thereto through conduit 176 for sealingly engaging the bore through the stator and also for sealingly engaging the inner sleeve part 178 that is concentric with previously mentioned sleeve 154.

Opening into the space between sleeves 154 and 178 is a fluid supply conduit 180 through which heated varnish is supplied to the stator windings. This varnish, as has been explained previously, may carry particles of solid insulating material, such as asbestos fiber or mica flakes or the like. The heated varnish passes upwardly through the stator, impregnating the windings and depositing a layer of the varnish on all of the exposed parts of the stator and then passes through a bore 182 into a tube 184 extending downwardly through the center of bag 174 and then leaves the apparatus through conduit 186 leading from the inside of sleeve 178.

When the apparatus is in position illustrated in FIGURE 9, the stator is impregnated and when this step is finished, rod 172 and the parts connected therewith is moved upwardly to its FIGURE 10 position in cylinder 168 and then motor 166 is availed of for shifting the slide 162 to its FIGURE 10 position. In this position the second section of the slide becomes operative and a hollow ram 190 is actuated to move downwardly through a cylinder or sleeve 192 in order to position the lower end of the ram inside the stator. At this time the extended lower end of the ram engages a seat 194 thus closing off conduit 186. Also, a collar or piston 196 on ram 190 is moved to a position just above an air supply branch 198 opening into cylinder 192.

Branch 198 is adapted for supplying hot air under pressure so that the air will flow downwardly about ram 190 to be deflected outwardly by the collars 200 thereon thus to set up the varnish, and the heated air then passes to the inside of ram 190 through the ports 202 and departs upwardly through the ram, either to be exhausted or to be reheated.

The support of the ram on the axis of the bore of the stator may be facilitated by the provision of an apertured guide collar 204 mounted on the ram and slidably fitting cylinder 192.

The modification of FIGURES 9 and 10 is adapted for high speed, automatic operation, and the treated stator can readily be moved out of working position and another moved in, merely by lowering turret 150 a short distance until the stator is free of sleeve 156, and then rotating the turret to bring a new stator into position to be treated. The modification of FIGURES 9 and 10 thus adapts itself to combining the impregnation operation with automatic winding machines and the like.

By way of general comment with regard to the process disclosed in the present application, there may advantageously be provided a preheating step for the stator in which hot air is passed through the stator prior to the impregnation thereof. This will facilitate in causing the varnish to remain readily flowable as it penetrates the windings and should also assist in removing air pockets from the windings. While the time and temperature of such a preheating step is not fixed, it is believed that for small motors a 2 minute flow of air heated to about 400° F. and under slight pressure, say, about 2 inches of mercury, will be sufficient.

The following impregnation by fluid may take place at a pressure of about 20 pounds per square inch, with flow continuing for about one minute and with the fluid being heated to about 120° F. In this step, also, the temperature, pressure and time would be varied to meet the particular circumstances encountered.

Following the impregnation the drying step will again use air heated to about 400° F. and at about the same pressure as was employed in the preheating step, with the heated air being circulated for about three minutes thereby partially or completely to bake the varnish in the windings.

As has been explained, an evacuation of the windings may be used before or during the impregnation operation, but it is believed that the circulation of the fluid under pressure will, in most cases, make the evacuation of the windings unnecessary.

It will also be appreciated that the curing of the impregnating fluid by the use of hot gases is not necessarily the only way in which suitable insulating materials could be set up. In general, heat will be required, and this could be developed, for example, by high frequency induction, or the heating could be accomplished by infra red lamps or by other radiation thereby eliminating the final baking by hot air.

In any case, the end result is a completely and highly efficiently impregnated and insulated electromagnetic unit.

It will be apparent that many modifications can be made in the process and apparatus described above without in any way departing from the spirit of the invention. Thus, while electric motor stators have been illustrated as the particular workpiece being treated, it follows that a simple inversion of the apparatus would permit the treatment of armatures and the same advantages would obtain in that the windings would be completely impregnated while the face of the iron that is to run adjacent to the other iron in the motor will remain clean and free of the insulating material.

It will also be evident that while reference has been made to supplying the insulating material under pressure, this pressure is variable between wide limits and in certain cases, as for example, in the case of an electromagnetic unit having windings of relatively heavy wire, a smaller pressure could be employed than would be practicable with an electromagnetic unit having windings of fine wire. The term "pressure" is thus to be considered as a relative term in certain cases.

Similarly, while it is preferred for the insulating material to be applied by flowing it over and through the windings, it is also possible to supply the electric insulating material from both ends of a stator or armature, or like unit, whereby the insulating material would penetrate from opposite ends and thoroughly impregnate the windings rather than being flowed therethrough from one end means. This latter method of supplying the electric insulating material might become practicable in a situation where the electromagnetic unit was subjected to a relatively high vacuum preparatory to impregnation of the windings whereby substantially to insure the removal of all gases from the windings.

It has also been mentioned that while conventional insulating varnishes have been referred to specifically and are, in fact, the preferred insulating material, other insulating materials could be found among various resins and polymerizable compositions of that nature could be employed. Certain of these substances would have considerable advantage in cases where the polymerization was accomplished by the use of radioactive material such as cobalt 60. In such a case, the polymerization or setting up of the insulating material is substantially instantaneous, no heat is required and the curing of the insulating material takes place completely through the body of the windings at the same instant.

It will be understood that this invention is susceptible to modification in order to adapt it to different usages and conditions; and accordingly, it is desired to comprehend such modifications within this invention as may fall within the scope of the appended claims.

I claim:

1. An apparatus for treating electric motor stators to impregnate and coat windings thereon which comprises; members operable for sealingly engaging opposite ends of a wound electric motor stator, an expansible bag carried by one of said members adapted for sealingly engaging the bore in the entire length of the stator when inflated, a supply of electric insulating varnish and solid insulating material entrained therein, means for pumping the varnish and the material entrained therein from said source into one of said members and through said windings under pressure into the other member and thence back to said supply thereby to impregnate and coat the windings with the varnish and to coat the outer parts of the windings with the solid material, and means operable following the impregnating and coating for circulating heated gases over the windings to set the varnish and fix the coating in place, said members comprising partition means therein engaging the ends of the stator between windings thereon and defining cavities to which said varnish and entrained solid materials are supplied whereby portions of the stator not having windings can be isolated from the varnish so that individual windings placed on the stator can be individually treated.

2. An apparatus for treating electric motor stators to impregnate and coat the windings, which comprises the combination of means for sealing the opposite ends of the wound electric motor stator having a central bore therethrough, and an expansible bag arranged in said stator bore adapted when inflated to sealingly engage the walls of said bore, a source of flowable heat curable electrical insulating coating composition, means comprising conduits connecting to said coating source with said stator bore for flowing the coating composition into and impregnating said windings, means engaging the ends of said stator between the winding thereon and defining cavities to which said coating composition is supplied, whereby portions of said stator can be isolated from contact with the coating composition.

3. An apparatus for treating electric motor stators to impregnate and coat the windings, which comprises the combination of means for sealing the opposite ends of the wound electric motor stator having a central bore therethrough, and an expansible bag arranged in said stator bore adapted when inflated to sealingly engage the walls of said bore, a source of flowable heat curable electrical insulating coating composition, means comprising conduits connecting to said coating source with said stator bore for flowing the coating composition into and impregnating said windings, means engaging the ends of said stator between the winding thereon and defining cavities to which said coating composition is supplied, whereby portions of said stator can be isolated from contact with the coating composition, means for pumping said liquid coating composition into said stator and for impregnating and coating said windings, and means for heating said resultant coated windings to form a hard, tough film of the coating composition thereon.

4. A method for treating electric motor stators to impregnate and coat the windings thereof, and comprising the steps of enclosing and sealing the opposite ends of a wound electric motor stator having a central bore therethrough, restricting the central bore of the stator to define cavities in which a coating and impregnating heat-curable electrical insulating composition is introduced, pumping the heat-curable electrical insulating material composition into said windings to impregnate and coat the windings, isolating said windings to restrict contact of said liquid coating composition thereto, and baking the resultant coated windings to set and fix the coating thereon and form a tough electrical insulating film thereover.

References Cited in the file of this patent

UNITED STATES PATENTS

| | | |
|---|---|---|
| 1,587,110 | Fisher | June 1, 1926 |
| 1,675,419 | Myers | July 3, 1928 |
| 2,340,905 | Sigmund | Feb. 8, 1944 |
| 2,412,954 | Zdancewicz | Dec. 24, 1946 |
| 2,573,126 | Andrus | Oct. 30, 1951 |
| 2,648,018 | Meier | Aug. 4, 1953 |
| 2,777,962 | Maynard | Jan. 15, 1957 |

FOREIGN PATENTS

| | | |
|---|---|---|
| 166,397 | Australia | Jan. 7, 1954 |